Figure 1:
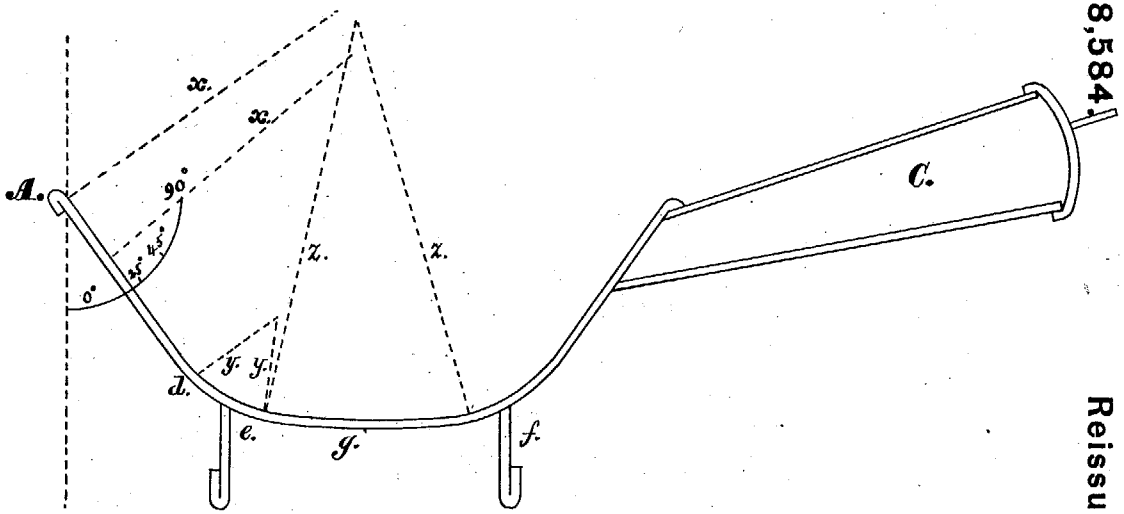

J. SCHEIDER,

Assignor to L. INGERSOLL.

Gravy-Strainer.

No. 8,584. Reissued Feb. 18, 1879.

Witnesses:

P Nolan

Chas Geo. Thomas

Inventor:

Joseph Scheider

N. PETERS, PHOTO-LITHOGRAPHER, WASHINGTON, D. C.

J. SCHEIDER,
Assignor to L. INGERSOLL.
Gravy-Strainer.

No. 8,584. Reissued Feb. 18, 1879.

Witnesses;
P. Nolan
Chas. G. M. Thomas

Inventor;
Jos. B. Scheider

N. PETERS, PHOTO-LITHOGRAPHER, WASHINGTON, D. C.

UNITED STATES PATENT OFFICE.

JOSEPH SCHEIDER, OF NEW YORK, N. Y., ASSIGNOR TO LORIN INGERSOLL.

IMPROVEMENT IN GRAVY-STRAINERS.

Specification forming part of Letters Patent No. 198,999, dated January 8, 1878; Reissue No. 8,584, dated February 18, 1879; application filed January 18, 1879.

*To all whom it may concern:*

Be it known that I, JOSEPH SCHEIDER, of the city, county, and State of New York, have invented a new and useful Improvement in Gravy-Strainers, which improvement is fully set forth in the following specification, reference being had to the accompanying drawings.

All gravy-strainers, in order to be useful, must be very deep in proportion to their diameter, and therefore they have heretofore been made in the following manner:

The cup has been made of tin, bent into the form of the frustum of a cone, and the edges soldered together, the sides flaring in straight lines. The bottom or strainer has been cut out of a separate piece of perforated tin and soldered or otherwise fastened in.

Strainers so made have been very costly, owing, first, to the waste of material in cutting the blanks for the cups and for the perforated strainers; secondly, owing to the high price of perforated tin; and, thirdly, owing to the labor of cutting the different parts and of soldering them together.

In order to save expense in manufacture, many attempts have been made to produce a strainer by stamping with dies; but it has been found, by many experiments, that a cup having a diameter of about four or five inches (which is the most useful size for gravy-strainers) cannot be stamped from a flat blank of metal to a depth of more than about one inch with a die made in the shape of the frustum of a cone, or in that of a hemisphere, or in any shape except that hereinafter described, unless very heavy metal and great power in stamping are used, for thinner material will break in the process of manufacture at the side or at the angle formed by the sides and bottom.

I have discovered that by forming the dies with the lines of the side from the top or rim to the center of the bottom, and thence to the opposite point on the top or rim in substantially the curve shown in the drawing, the strain upon the metal is equally distributed, and a much greater depth of cup can be obtained, and from much lighter and less expensive material.

By my invention I am able to use the lightest and least expensive material upon the market, known as "I. C. tin."

My invention, therefore, consists of a gravy-strainer stamped out of a single blank of metal, with perforations through the bottom of the same, and the curve of the side of which from any point on the rim to the center of the bottom, and thence to the opposite point on the rim, may, by reference to the drawings, which represent a vertical section, and the depression *b*, be thus described, viz: a continuous curve, commencing at any point, A, Fig. 1, on the rim of the cup, and running at first in a curve of very long radius, such as *x x*, and at an angle inclined inward about twenty-five degrees from the perpendicular, and taking a shorter radius as it descends, so that the curve is most abrupt at a point nearer the center of the bottom *g*, by measurement upon the metal, than it is from the starting-point on the rim A. The radius of this abrupt curve is represented by *y y*. The half-way point of the side is represented by *d*. The curve then again takes a longer radius, *z z*, until it reaches the center of the bottom *g*, and, passing through said center, it then ascends the opposite side in curves similar to those described, but in reverse order. The space from *e* to *f* designed to be perforated thus curves upward at its edges, and is almost horizontal near its center.

By thus substituting the use of dies for hand-work and soldering I am able to make a much deeper, neater, lighter, and stronger gravy-strainer than has ever been upon the market, and at less than one-half the former cost of production. I am able, with two sets of dies—one for forming the cup and one for making the perforation—to turn out per day about thirty-five gross of my improved strainers, employing only five hands, whereas, by the old method, forty hands would be required to produce as many.

Figure 2:
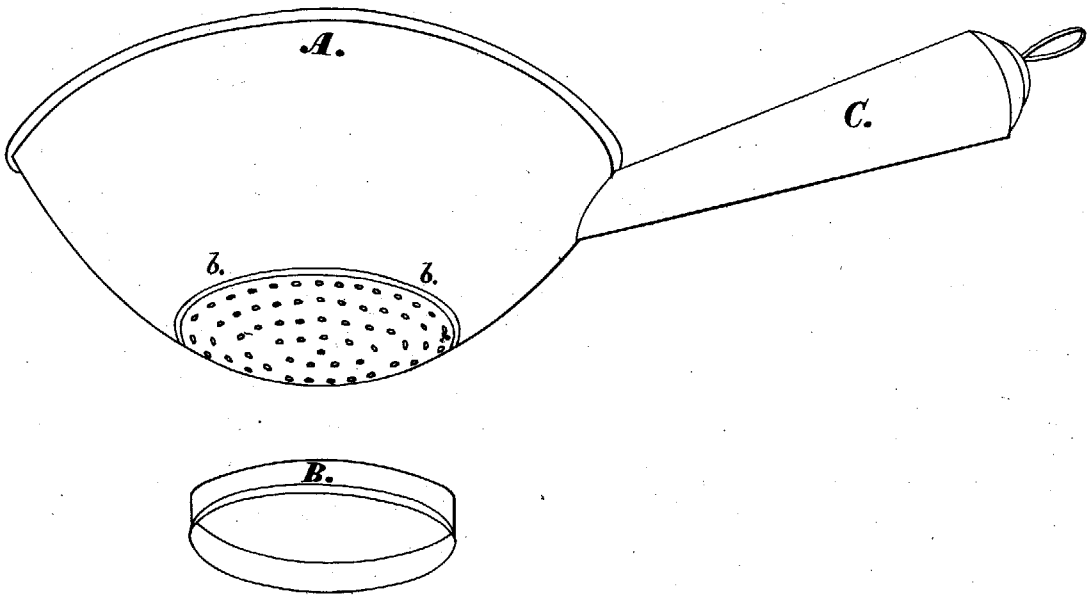

Around the bottom, and just above the perforations, there may be a very slight depression, *b*, Fig. 2, from the outside, into which fits and is soldered the edge of the foot B. The strainer is then completed by wiring the edge at A and soldering or riveting on the handle C.

I am aware that wash-basins have been made out of sheet metal, as shown in the patents of J. C. Knoepke, May 15, 1866, Wm. Bradley, August 27, 1867, John Gilbert, March 24, 1868, Wm. Westlake, December 19, 1871, and J. Hamilton, July 17, 1877.

Some of these basins are made with dies. Those of Gilbert and Knoepke are the only ones which have any considerable depth; but these have straight sides joining the bottom at a sharp angle, and the method of their manufacture is not stated. That of Westlake has a flat bottom, which also joins the sides at an angle. The curves are not continuous. Those of Hamilton and Bradley are very shallow, the sides and bottom of the first forming, practically, the arc of a circle, with sharp depressions, and the second having for sides full quadrants of a circle, with a wide bottom between them.

Dies made in these forms would be useless for the purpose of my invention, and I disclaim all these forms.

What I claim as my invention, and desire to secure by Letters Patent, is—

1. A gravy-strainer stamped out of a single blank of metal, the line of whose side in any vertical central section being a continuous curve of long radius near the rim and near the center of the bottom, and of short radius and more abrupt curvature in an intermediate space which is nearer to the center of the bottom than to the rim, substantially as described.

2. A gravy-strainer stamped out of a single blank of metal, having a continuously-curved side, the curve of which is gradual through the first half of the descent from any point on the rim to the center of the bottom, then more abrupt, and then again gradual near the center of the bottom, and having perforations through the bottom of the same piece of metal, substantially as described.

3. A gravy-strainer consisting of a cup stamped out of a single piece of metal, perforated at the bottom, and having a suitable handle, C, the said cup having a continuously-curved side, the curve of which is gradual through the first half of the descent from any point on the rim to the center of the bottom, then more abrupt, and then again gradual near the center of the bottom, substantially as described.

JOSEPH SCHEIDER.

Witnesses:
P. NOLAN,
CHAS. G. M. THOMAS.